United States Patent [19]

Lu

[11] Patent Number: 4,568,723

[45] Date of Patent: Feb. 4, 1986

[54] BLENDS OF POLYPROPYLENE, POLYCARBONATE AND A SATURATED STYRENE-ETHYLENE-BUTYLENE-STYRENE RUBBER

[75] Inventor: Pang-Chia Lu, Belle Mead, N.J.

[73] Assignee: Mobil Oil Company, New York, N.Y.

[21] Appl. No.: 669,542

[22] Filed: Nov. 8, 1984

[51] Int. Cl.[4] ............................................. C08L 69/00
[52] U.S. Cl. ...................................... 525/92; 525/146; 525/468
[58] Field of Search .................. 525/92, 146, 468, 901

[56] References Cited

U.S. PATENT DOCUMENTS 3,437,631  4/1969  Cleveland ........................ 525/468
4,102,854  7/1978  Gergen et al. ..................... 525/92
4,481,323  11/1984 Sterling .......................... 525/92

Primary Examiner—Theodore E. Pertilla
Attorney, Agent, or Firm—Alexandera J. McKillop; Michael G. Gilman; James P. O'Sullivan, Sr.

[57] ABSTRACT

A composition suitable for melt extrusion in film form comprising an intimate thermoplastic blend of: polypropylene, polycarbonate, and a saturated block copolymer of styrene-ethylene-butylene-styrene.

5 Claims, No Drawings

BLENDS OF POLYPROPYLENE, POLYCARBONATE AND A SATURATED STYRENE-ETHYLENE-BUTYLENE-STYRENE RUBBER

BACKGROUND OF THE INVENTION

Because of its excellent moisture barrier characteristics polypropylene resins find wide utility in film form in the food packaging industry. Polypropylene film, however, has rather poor tear strength, both in the machine direction and transverse direction orientation of the film. This is improved to some extent by the addition of polycarbonate to the polypropylene, however, the polycarbonate addition severely reduces the percent elongation property in the transverse direction of an oriented film.

It is an object of the present invention to improve the Elmendorf tear strength of a polypropylene film and at the same time to significantly improve the elongation properties of the resulting film.

SUMMARY OF THE INVENTION

The compositions of this invention, which are melt extrudable in film form, comprise three essential components, polypropylene, polycarbonate and a block copolymer of styrene-ethylene-butylene-styrene. The melt blended compositions are melt extruded as single films or they may be coextruded with other polymers. The resulting films range in optical characteristics to from transparent, to translucent, to opaque.

DETAILED DESCRIPTION OF THE INVENTION

Generally, the compositions in accordance with this invention comprise: from about 98.5–50 wt. % of polypropylene; about 1–40 wt. % of polycarbonate; and about 0.5–10 wt. % of a saturated rubber block copolymer of styrene-ethylene-butylene-styrene, wherein the styrene is present in from about 13–37 mole %, and the ethylene and butylene are present in equal mole % to make up the remainder.

Preferably, the polypropylene comprises from 85 to 55% by weight, the polycarbonate comprises from the 10–40 wt. % and the styrene-ethylene-butylene-styrene copolymer is present in from about 2–7 wt. % of the mixture.

Blending is accomplished at elevated temperatures, e.g. about 240° C., in any manner recognized in the art, for example, a laboratory model, Brabender extruder, can be employed. This device has a ¾ inch screw which has a L/D ratio of 25:1.

The contemplated polypropylene preferably is a highly crystalline or highly stereoregular polypropylene. The preferred polypropylenes are well known in the art and are formed by polymerizing propylene in the presence of stereospecific catalyst systems. They can have a melt flow rate at about 230° C. ranging from about 1 to about 25, preferably 2 to 4. The crystalline melting point is about 321°–325° F. The number average molecular weight ranges from about 25,000 to about 100,000. The density ranges from about 0.90 to 0.91.

The contemplated polycarbonates are those described in U.S. Pat. No. 3,431,224, the disclosure of which is, in its entirety, incorporated herein by reference. More specifically, the polycarbonates are aromatic carbonate polymers prepared by reacting a dihydric phenol with a carbonate precursor such as phosgene, a haloformate or a carbonate. A particularly preferred polycarbonate is poly(2,2-diphenyl propane)-carbonate. Preferably the carbonate used in the blend of the invention will have an intrinsic viscosity (as measured in p-dioxane in deciliters per gram at 30° C.) ranging from about 0.35 to about 0.75.

A preferred saturated block rubber copolymer of styrene-ethylene-butylene-styrene is a material commercially known as Kraton G-1652, wherein the styrene is present in from about 29% mole %, the ethylene is present in 35.5 mole % and the butylene is present in from about 35.5 mole %. This material is commercially available from Shell Chemical.

The styrene-ethylene-butylene-styrene copolymers are referred to as S-EB-S in U.S. Pat. No. 4,188,432. The disclosure of this patent is incorporated herein by reference in its entirety. These block copolymers may be prepared as recited in this patent and also as disclosed in U.S. Pat. No. 3,595,942, the disclosure of which is incorporated by reference herein in its entirety.

Although the invention has been described with reference to three essential ingredients, it will be understood that various additives such as fillers, pigments, stabilizers and the like may be incorporated therein without departing from the spirit and scope of the invention. Similarly, it is within the scope of this invention to utilize the compositions described herein as a layer or layers in combination with other polymeric layers in multi-films. For example, compositions of this ivention can be coextruded with one or more layers of polyolefins such as polypropylene, polyethylene, etc. The films of this invention are suitable for use in packaging foods.

The invention is further illustrated by the following non-limited examples.

EXAMPLES 1-4

A series of compositions were prepared, as indicated in the following table, including polypropylene (PP), polycarbonate (PC) and styrene-ethylene-butylene-styrene copolymer (SEBS). Mixing was accomplished by combining the subdivided resins dry and, thereafter, mixing the same in the above-described Brabender mixing heating and extrusion apparatus. The melt temperature for the compositions was approximately 240° C. In each case the composition was extruded through a slot die 6 inches wide and 30 mils thick. The resulting films were subjected to the tests indicated in the following table.

TABLE

| | Example 1-PP | | 2-PP/PC | 3-PP/PC/SEBS | 4-PP/SEBS |
|---|---|---|---|---|---|
| % wt. ratio | | 100 | 85/15 | 82/15/3 | 96.5/3.5 |
| Tensile Strength ($\times 10^3$ p.s.i.) | MD | 7.6 | 3.8 | 6.1 | 6.8 |
| | TD | 4.3 | 2.7 | 4.4 | 6.3 |
| % Elongation | MD | 860 | 350 | 640 | 910 |
| | TD | 480 | 6 | 670 | 910 |
| Elmendorf tear strength (g./mil) | MD | 6 | 30 | 36 | 26 |
| | TD | 22 | 200 | 240 | 40 |

By the data of the Table it is clear that polypropylene film by itself, (Example 1) has rather poor Elmendorf tear strength. While this is significantly improved by the addition thereto of polycarbonate, (Example 2), unfortunately the percent elongation in the transverse direction (TD) is significantly impaired. Polypropylene with the styrene-ethylene-butylene-styrene copolymer, (Example 4), has impaired Elmendorf tear strength.

Example 3 shows that by the inclusion therein of a small percentage of the styrene-ethylene-butylene-styrene copolymer, in addition to the polycarbonate, not only is the Elmendorf tear strength improved but, the percent elongation and the tensile strength in both the machine direction and transverse direction is significantly improved.

What is claimed is:

1. A composition suitable for melt extrusion in film form comprising an intimate blend of from about 50–98.5 wt. % of polypropylene, from about 1–40 wt. % of a polycarbonate and from about 0.5–10 wt. % of a saturated block copolymer of styrene-ethylene-butylene-styrene, wherein said copolymer has about 13–37 mole % styrene, and the remainder equal mole % proportions of ethylene and butylene.

2. The composition of claim 1 having the approximate proportions of 82 wt. % polypropylene, 15 wt. % polycarbonate and 3 wt. % styrene-ethylene-butylene-styrene copolymer.

3. The composition of claim 1 in film form.

4. The composition of claim 1 in unoriented film form.

5. The composition of claim 1 in which said polypropylene is a highly crystalline polypropylene and said polycarbonate is poly(2,2-diphenyl propane)-carbonate.

* * * * *